United States Patent
Popp

(10) Patent No.: US 7,878,527 B2
(45) Date of Patent: Feb. 1, 2011

(54) COLLAPSIBLE FRAME FOR A PUSHCHAIR

(75) Inventor: Alexander Popp, Redwitz (DE)

(73) Assignee: Endepro GmbH, Redwitz a.d.R. (DE)

( * ) Notice: Subject to any disclaimer, the term of this patent is extended or adjusted under 35 U.S.C. 154(b) by 573 days.

(21) Appl. No.: 11/662,678

(22) PCT Filed: Sep. 15, 2005

(86) PCT No.: PCT/EP2005/009922

§ 371 (c)(1),
(2), (4) Date: Jan. 22, 2008

(87) PCT Pub. No.: WO2006/029859

PCT Pub. Date: Mar. 23, 2006

(65) Prior Publication Data

US 2008/0284137 A1    Nov. 20, 2008

(30) Foreign Application Priority Data

Sep. 15, 2004   (DE) .................. 20 2004 014 474 U

(51) Int. Cl.
*B62B 7/10* (2006.01)
*B62B 3/02* (2006.01)

(52) U.S. Cl. ........................ 280/647; 280/642; 280/658; 280/47.38

(58) Field of Classification Search ............... 280/35, 280/639, 642, 643, 647, 657, 658, 47.38
See application file for complete search history.

(56) References Cited

U.S. PATENT DOCUMENTS

| | | | | |
|---|---|---|---|---|
| 1,035,976 A | * | 8/1912 | Kurz ........................ 280/642 |
| 2,489,593 A | * | 11/1949 | Shaw ........................ 280/647 |
| 3,236,556 A | * | 2/1966 | Lathers ..................... 296/65.08 |
| 4,874,182 A | * | 10/1989 | Clark ........................ 280/30 |
| 5,611,551 A | * | 3/1997 | Lin ........................... 280/32.5 |
| 5,707,067 A | * | 1/1998 | Smith ........................ 280/32.6 |
| 6,199,877 B1 | * | 3/2001 | Shockley .................. 280/32.6 |
| 6,425,590 B1 | * | 7/2002 | Whiteside et al. .......... 280/32.6 |

FOREIGN PATENT DOCUMENTS

DE    40 25 009 A1    2/1992

* cited by examiner

*Primary Examiner*—J. Allen Shriver, II
*Assistant Examiner*—Bryan A Evans
(74) *Attorney, Agent, or Firm*—Pandiscio & Pandiscio

(57) ABSTRACT

The invention relates to a collapsible frame (1;31;51) for a pushchair, comprising a chassis (4; 34; 54) with several wheels (2, 3; 32, 33; 52, 53, 53'), a frame (5; 35; 55), supporting the body (6), in particular a seat, shell, pouch or similar for a child, and a folding mechanism (7; 37; 57), arranged between the same, to change the separation of the support frame (5; 35; 55) of the body (6) from the chassis 4; 34; 54), whereby the folding mechanism (7; 37; 57) comprises at least two parallel arms (18, 19; 40, 41; 66, 67), connected in the style of a parallelogram link to the chassis (4; 34; 54) at one side and the to the support frame (5; 35; 55) on the other side. According to the invention, the connecting line between the joints points (39: 65) of both arms (18, 19; 40, 41; 66, 67) of a pair on the chassis (4; 34; 54) include a greater angle with the horizontal contact plane of the wheels (2, 3; 32, 33; 52, 53, 53') than with the verticals running perpendicular to that plane.

16 Claims, 5 Drawing Sheets

COLLAPSIBLE FRAME FOR A PUSHCHAIR

The invention is directed to a collapsible frame for a child carriage, comprising a chassis with a plurality of wheels and a frame supporting the superstructure, particularly a seat, shell, pouch or the like, for children, and, disposed therebetween, a folding mechanism comprising at least two mutually parallel links articulated in the manner of a parallel linkage to the chassis, on the one hand, and to the support frame, on the other.

In ordinary commercial child carriages, the folding mechanism is configured as a scissor mechanism, i.e., two struts disposed one on each side of the carriage intersect in the manner of a scissors or an X and are articulately connected to each other at their intersection point. The carriage is unfolded by pivoting such a scissors apart, and is then ready for use. It can be folded by pivoting the two scissor struts together.

A scissor mechanism requires, on the one hand, that at least one scissor end on each side of the carriage be detachable either from the support frame or from the chassis. If such a detachable connection to the support frame for the superstructure or the chassis is not reliably made, then the folding mechanism may become unstable and, in the worst case, cause the carriage to collapse during use.

German Patent DE 40 25 009 C2 describes a frame for a child carriage comprising a chassis and a seat that are connected to each other via two lateral parallelogram linkages, so that during collapsing the seat does not tilt, but maintains its spatial orientation. Owing to the configuration of this parallelogram linkage, the seat, as it is folded down, also undergoes a sizable shift in the direction of travel, and sticks out considerably beyond the chassis in the folded state.

However, the smallest possible space consumption in the folded state is an essential feature of a good folding mechanism, so that for example a carriage can be stowed and transported in the narrow confines of an automobile trunk. From this comes the problem of creating a folding mechanism that allows the carriage to be folded into an extremely small space.

The solution to this problem is achieved, in a frame of this kind, by the fact that the connecting line between the points of articulation of the links, which lie approximately in a common plane, to the chassis forms a greater angle with the horizontal contact plane of the wheels than with the verticals extending perpendicular to that plane.

Implicit in the invention is, on the one hand, that the support frame is configured as largely inherently rigid, i.e. is not collapsed, and on the other hand, that the links of the parallelogram linkage and thus the distances between the two articulation points of any given link have approximately identical lengths, so that the connecting line between the upper articulation points of the links lying approximately in a common plane always remains approximately parallel to the connecting line between the lower articulation points of those links of the parallelogram linkage. Furthermore, there are preferably at least two mutually parallel links on each side of the child carriage, i.e. preferably two mutually parallel pairs of links.

By virtue of the fact that the mutual spacing and the geometric relative arrangement of the upper articulation points of all the (supporting) links are identical to the corresponding parameters of the lower articulation points, all the struts or (supporting) links interconnecting the superstructure/support frame and the chassis always extend parallel to one another. As a result, both during downward pivoting and during unfolding, the support frame and thus also the superstructure trace a circular path whose center point is in the region of the lower articulation points of the parallel links and whose radius is defined by the (identical) respective lengths of all the mutually parallel links. Such a well-defined circular path imparts a high degree of precision to the folding mechanism throughout the entire folding process, and undefined intermediate positions are avoided. As explained further hereinafter, in most cases there is no need for a locking strut that has to be actuated separately and would have to be non-parallel to the support links.

In addition, parallel links have the further advantage over a scissor mechanism of ensuring a constant horizontal orientation of the support frame during collapsing or erecting, without additional guides.

In a parallel-link linkage, all the struts on one side of the carriage can be disposed in a common plane without intersecting. This reduces the width of the linkage and consequently also—if desired—the width of the chassis. Of course, the kinematically possible pivoting range of a parallelogram linkage is also thereby limited to an angle of less than about 180°. This is limited for example by the straight connecting line between the paired (upper vs. lower) articulation points of the links located for example in a common plane.

Since in the arrangement according to DE 40 25 009 C2, the lower (and also the upper) articulation points of the two links on one side of the frame are located at about the same height, the allowable pivot angle extends in this case in a vertical midplane of the carriage approximately from a ray in the direction of travel to a ray opposite the direction of travel. In both end positions of such an (expanded) pivoting movement, [subject missing] are located at the same height; the maximum height difference instead occurs in the middle position, pivoted upward by about 90°. Thus, in this prior design no use whatsoever is made of the maximum, approximately 180° pivot angle of a flat parallelogram linkage; instead, the links traverse an angle of just 60° in being collapsed from the completely unfolded position to the completely folded position. This in turn has the consequence, on the one hand, that the maximum attainable height difference is smaller than or at best equal to the distance between the articulation points of a link, while on the other hand, when this maximum attainable height difference is used up[3], during the collapsing process the superstructure additionally undergoes a lateral shift in the direction of travel with respect to the chassis by exactly the amount of this distance, and is therefore folded down, not onto the chassis, but next to it.

[3] TRANSLATOR'S NOTE: We have altered this clause slightly to make sense of it. It actually reads "while on the other hand, the using up of this maximum attainable height difference, during the collapsing process the superstructure additionally undergoes . . . ." That is, there are two subjects, "using up" and "superstructure," both with nominative articles.

By virtue of the fact that according to the teaching of the invention, the mutually corresponding (upper vs. lower) articulation points of the links located approximately in a common plane are offset from each other to a greater extent in the vertical direction than in the horizontal direction, the connecting line between these articulation points is relatively steep, approximately vertical in the limiting case. This has the consequence that the two boundary rays of the maximum pivot angle between the two end positions of the parallelogram linkage are not located at the same height, but are markedly offset from each other in the vertical direction. The parallelogram linkage can therefore be pivoted nearly 180°. The inventive articulation enables the links of the parallelogram linkage to traverse a pivot angle of more than 120°, preferably of more than 135°, particularly of more than 150°, between the collapsed and erected states of the child carriage frame. This has the consequence that the vertical distance between the collapsed and erected positions of the support frame is much greater than the horizontal distance. In the ideal case, in its lower position the support frame has no horizontal displacement relative to its upper position. In addition, the vertical distance between two positions can be greater than the length of a link or the distance between the two articulation points of a link, i.e. as much as approximately twice the value of the latter. As a result, assuming comparable lift heights for the folding mechanism, the links of the parallelogram need be configured as only half as long as in DE 40 25 009 C2, the folding mechanism thus becomes much more compact than in previously known designs, and the linkage is simplified and takes up less space in and of itself.

If the horizontal outer dimensions (length, width) of the support frame are smaller than the corresponding inner dimensions of a clearance in the upper side of the support frame, then the base area of the superstructure/support frame is smaller than the base area of the frame of the chassis. As a result, the superstructure/support frame can/could pivot down completely into or beneath the plane of the chassis and optionally sink thereinto.

For it to sink in this way, the support frame should be located between the links.

In addition, the fact of having the distance, measured parallel to a wheel axle, between two links on opposite sides of the child carriage frame be smaller than the correspondingly measured distance between two lateral strut elements of the chassis extending approximately in the direction of travel creates a clearance in the chassis that is able to accommodate the superstructure support frame on collapse.

The inventive folding mechanism is therefore able to pivot widely in such fashion that in the erected state of the child carriage frame, the ends of the links which are not articulated to the chassis are above their points of articulation to the chassis, whereas in the collapsed state they are below these articulation points. In the ideal case, the superstructure support frame can therefore be pivoted downward to just above the contact surface of the wheels; the space between the wheels of the carriage is therefore put to optimal use in the folded state.

It has proven favorable for at least one link of a folding mechanism to be shaped at least regionally as tubular. A tubular shape, by which hollow profile sections of angular cross section are also meant, represents an optimum compromise between the greatest possible stability and low weight. In addition, a tube offers the possibility of simple attachment by means of a locking pin engaging in the hollow space.

Candidate materials for the parallel links include, above all, a metal pipe, for example of aluminum, offering the advantage of a particular weight, or high-grade steel, which has particularly high stability.

On the other hand, parts of the chassis, particularly mounting elements for each pair of links, can be made of plastic; in particular, they can be injection-molded of fiber-reinforced plastic. Where appropriate, the journal points can be reinforced with set-in, pressed-in, glued-in or injected elements made of a hard or wear-resistant material, for example metal sleeves.

Further advantages are obtained by articulating the two links on the same respective side of the child carriage frame to a common mounting element of the chassis. In ordinary chassis constructed of interconnected tubes, special structures, for example brackets or the like, are necessary in the area of the articulation of the parallel links. These must in turn be attached to the chassis, for example by welding or adhesive bonding. Hence, disposing a plurality of articulation points on a common structure reduces the production expenditure associated with these joints. Moreover, in this way, adherence to a set distance between the respective articulation points does not depend on the joining technique, but only on the forming technique used on the mounting concerned, for example boring, stamping, etc. Such techniques make it possible to adhere to specified dimensions with far less expenditure. This ensures that the mechanism will not be susceptible to jamming.

This inventive idea can be developed further by having a mounting element of the chassis be formed by a bracket or by two preferably mutually parallel brackets, to which or between which the respective links are pivotably articulated. The pivot axle of the respective links preferably passes perpendicularly through the base plane of this bracket or these brackets. Two mutually parallel brackets can support a pivot axle on both sides of the link concerned, thereby producing an extreme degree of precision and stability.

Having two mounting brackets of the chassis that are assigned to the same links form the side legs of a fork or a profile section of U-shaped cross section ensures stable alignment of the two journal points for a link pivot axle. This feature, too, therefore increases the freedom from wear and ease of movement of the inventive folding mechanism.

As explained above, the inventive mounting elements for the links of the folding mechanism can be attached to the chassis, or they can be integrated with the chassis or be an element thereof, for example if the chassis has side members of approximately rectangular cross section on which the articulation points for the inventive parallel links can then be directly disposed, for example drilled or punched in. In the majority of cases, for example flat, fork-shaped or bracket-shaped mountings must be attached to bearing elements of the chassis that have a round cross section. A welding or adhesive bonding technique is best suited for this purpose.

The inventive design can be further optimized by having a fork-shaped or profile-shaped mounting element for a pair of links of the folding mechanism be tilted in the direction of travel relative to the chassis or relative to the common contact surface, for example at an angle of between ±20° and ±45° to the vertical. In such cases, the parallel links, when locked in their upper position, form the straight or unbent extension of the longitudinal axis of an elongated mounting. In addition to the advantageous aesthetics, this also makes for statics that are easy to calculate and control.

Adjustment of the height of the superstructure support frame relative to the chassis results from the fact that in the erected position, the parallel links extend more or less steeply upward, whereas in the collapsed position they extend downward. They must therefore be able to pivot past the horizontal. This can be achieved, with links that are articulated—to a common mounting element—at a very small distance from each other, only if the points of articulation of the two links of a pair to the respective mounting are disposed approximately vertically one above the other. It must be kept in mind in this regard that in such an arrangement, the connecting line between the two adjacent articulation points cannot be crossed by the linkage, since the two links preferably move in the same plane and in such cases then get in each other's way at this line. If this line extends approximately vertically, then the lever linkage or link linkage can be pivoted from a nearly vertically upward-pointing position to a nearly vertically depending position, and maximal height adjustability is achieved with minimal link length.

The invention is further characterized by the fact that the mounting elements and/or the lower articulation points of the parallel links are disposed between the front and rear wheels and thus between the front and rear axles, so that a pivoting movement is not obstructed by either the front or the rear axle of the chassis. In addition, the center of gravity of the carriage concerned is located approximately in the center of the superstructure support frame or the chassis—viewed, respectively, in the longitudinal direction or direction of travel—and twisting of the superstructure support frame or the chassis can thus be prevented by the simplest means.

The invention also affords the possibility of extending one of the two links of a pair beyond its point of articulation to the superstructure frame. This creates a kind of actuating lever that can easily be acted on to shift the inventive folding mechanism from one position to the other.

To increase the torsional stiffness of the inventive folding mechanism, the respective link extensions directed outwardly past the point of articulation to the superstructure frame can be connected to each other, preferably at their peripheral ends. This also facilitates the simultaneous actuation of both sides of the inventive folding mechanism.

If the interconnected extensions of the folding mechanism are configured as a push bar, then the latter can assume multiple functions, making it possible to simplify the design of an inventive child carriage and also economize on weight.

The push bar can be adjustable in length by means of articulated and/or telescoping joints, so that the child carriage as a whole can be collapsed for example to the dimensions of the chassis.

The invention further recommends that the region of an extended link developed into a push bar form an angle with its region between the support frame and the chassis of more than 45°, preferably more than 60°, particularly more than approximately 90° or more. In this way, in the fully erected position of the support frame, the push bar preferably points in a direction opposite the direction of the lower segment of the link. The predominantly vertical pivot angle of the lower segment of the link during collapsing thus is transformed into a predominantly horizontal pivot angle of the push bar proper. It is thereby possible for the latter to pivot over and past the support frame during erecting or collapsing, specifically by a similarly large overall pivot angle as the parallelogram linkage. This much larger angle compared to conventional push bars reduces the actuating force needed to open or collapse the inventive child carriage.

To lock the folding mechanism in the raised position, an arrangement for locking the folding mechanism in the raised position should be provided in the region of at least one articulation point, preferably to the chassis. This can be achieved for example by means of an element that encroaches into or is movable into the region of movement of at least one link, and which thereupon inhibits relative movement between the folding mechanism on the one hand and the chassis or superstructure support frame on the other. Since the lower position of the folding mechanism is stable in any event due to the force of gravity, and moreover is assumed only when the carriage is not in use, only the upper, inherently unstable position of the folding mechanism need be stabilized or locked. Assuming that the two sides of the folding mechanism are connected, therefore, a single locking arrangement is theoretically sufficient. Nevertheless, to keep the carriage from twisting, a respective locking arrangement should be provided on each side of the carriage.

The movement curve of a movable locking element can follow a circular path, pivoting about an axis of rotation in the manner of a lock hook, or it can follow an approximately straight line, in which case the element encroaching into the region of movement of a link is withdrawable from that region of movement. However, it is important that the movement curve of the locking element and the movement curve of the folding mechanism intersect or cross.

It is also of great significance for the locking mechanism that the element encroaching into the region of movement of a link be pushed or pulled into the region of movement of the link under the effect of a spring or a latching mechanism. When no force is being applied from the outside, the position of the movable locking element should be located on the movement curve of the folding mechanism, so that the latter durably remains in the locked state. The carriage can be collapsed only by manual, active release of the locking mechanism.

Such manual release of the locking mechanism is effected by means of an actuating element that is connected or coupled to the movable locking element, in order to draw it manually out of or back from this region of movement of the folding mechanism.

Particular advantages are afforded by an arrangement in which the element encroaching into the region of movement of a link is configured as a bolt that is coaxial with a tubular link in the upwardly pivoted position thereof. If the outer cross section of such a bolt approximately conforms to the inner diameter of a tubular link, then in addition to the locking function such a bolt can also assume a lateral guiding or stabilizing function.

This lock bolt can be slidably guided in its longitudinal direction, preferably against the action of an integrated spring. By suitably inclining or orienting the mounting profile section in alignment with the upwardly pivoted parallel links, the guide of such a bolt can be oriented parallel to the longitudinal axis of the mounting profile section. The spring element that pushes the bolt upwardly or outwardly against a link can be disposed in the region of this guide. This spring element can be configured for example as a spiral spring that embraces a rearward, coaxial extension of the bolt.

The invention makes it possible to divide the chassis or its longitudinal beams or struts into a front and a back region by means of the two lateral mounting elements for each pair of links. The front and back regions of the chassis can thus be designed differently, with characteristics that are optimized for the respective case and may, if desired, differ from each other.

For example, the two lateral mounting elements for each pair of links can be provided with a rearwardly projecting rocker arm, to the free end of which at least one rear wheel is journaled. Such a rocker arm can be implemented as variable in inclination relative to the rest of the chassis, for example in order to vary the inclination of the child seat.

Additionally or alternatively to such manual adjustability, it is also possible for two such rocker arms to be resiliently mounted relative to the respective mounting element. This enables the carriage to compensate for uneven ground, so it can be used elsewhere than on paved or asphalted surfaces. For this purpose, it is advantageous for the two rocker arms to be unconnected to each other in the manner of a single-wheel suspension, in contrast to the rigid axle often found in conventional child carriages.

On the other hand, a forwardly projecting strut can be disposed on each of the two lateral mounting elements for each pair of links. For stiffening purposes, these struts can be connected to each other, preferably in their front and/or back regions. Similar stiffening elements can also extend directly between the two mountings. These mountings, struts and connections together form the integrally rigid chassis proper.

The two forwardly projecting struts are preferably configured as hollow profile sections. This reduces weight while providing maximum stability.

In accordance with the intended use of the chassis, a front wheel is journaled in the region of the free end of each forwardly projecting strut. As is customary with many jogging or lightweight strollers, two mutually parallel wheels can also naturally be provided at that location. The front wheels may be steerable, thereby facilitating the control of such a carriage.

Finally, it is within the teaching of the invention to dispose each of the two front wheels on a respective end piece that is detachable from the respective forwardly projecting strut. This makes it possible for example to replace non-steerable wheels with steerable ones.

Further features, characteristics, advantages and effects based on the invention will become apparent from the following description of a preferred embodiment of the invention and by reference to the drawing. Therein:

Figure 1:
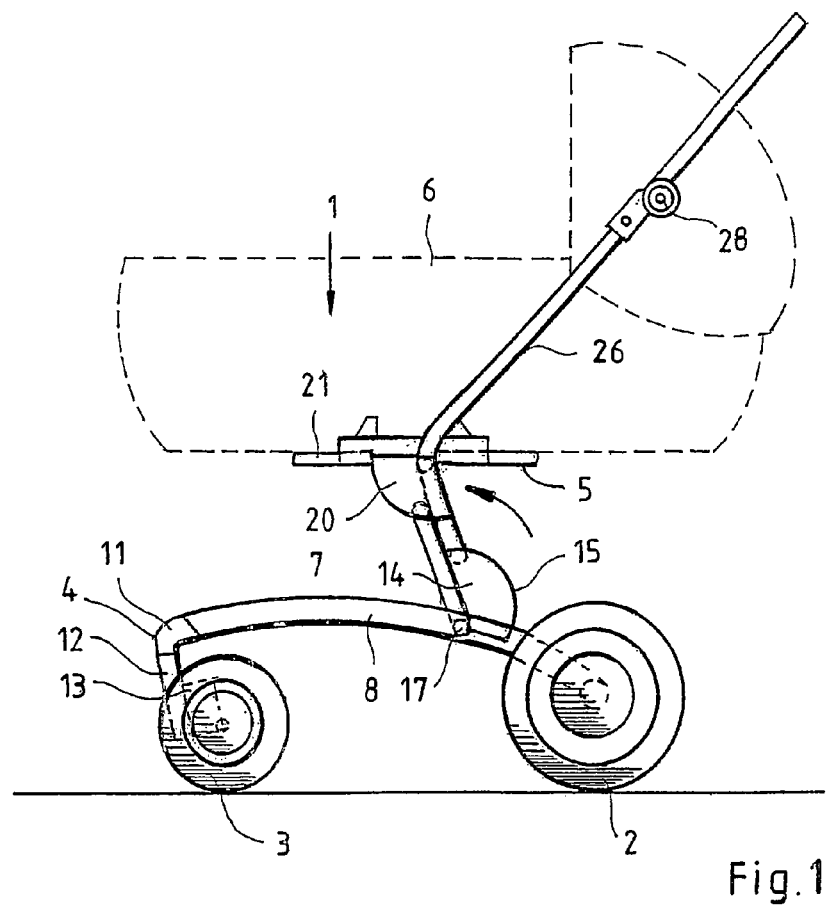
FIG. 1 is a side view of an inventive child carriage frame, with the superstructure indicated thereon.
Figure 2:
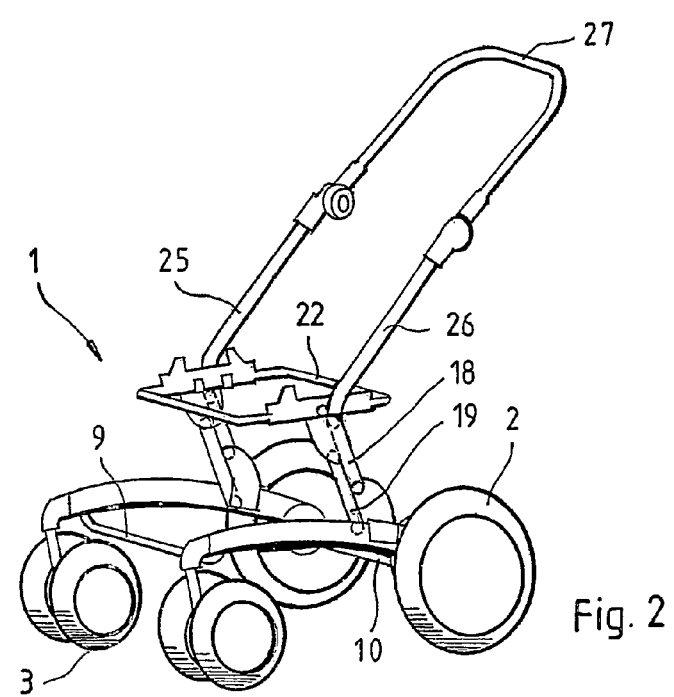
FIG. 2 shows the erected child carriage frame from FIG. 1 in perspective representation.

Illustrated in FIGS. 1 and 2 is an inventive frame 1 for a child carriage, which in this case is a steerable child carriage in the nature of a jogging stroller or a lightweight stroller, with two fixedly oriented rear wheels 2 and steerable front wheels 3. The type of carriage (toddler stroller, twin stroller, jogging stroller, lightweight stroller) has as little bearing on the invention as the number of wheels; there can be four, six or eight wheels, or there may be only three.

The frame 1 is divided into three sections: the chassis 4 proper, which carries the wheels 2, 3; a frame 5 to support the (optionally variable) superstructure 6; and a folding mechanism 7 interconnecting the chassis 4 and the support frame 5.

The chassis 4 includes two, in this case curved, longitudinal beams 8, which are rigidly interconnected in their front and back regions by in each case one transverse strut 9. Disposed at the back end of each longitudinal beam 8 is the journal bearing for the respective rear wheel 2. At its front end, each longitudinal beam 8 is bent 12 approximately vertically downward via a respective knee piece 11. Pivotably journaled about [each of] these approximately vertical segments 12 is an axle-journal-bearing component 13. Received in each axle journal bearing 13, which can be steered in this fashion, is an axle with two front wheels.

The folding mechanism 7 is connected to both longitudinal beams 8 of the chassis 4. For this purpose, a mounting plate 14 is upwardly projectingly attached, particularly welded, to each longitudinal beam 8. Each mounting plate 14 can comprise two brackets that embrace the respective longitudinal beam 8 on both sides thereof, thereby in itself creating a positive lock. The plane of the plate is preferably disposed at the inward side of the longitudinal beam 8 concerned. The two mounting plates 14 are arranged symmetrically to the center plane of the chassis 4 and are oriented parallel both to the respective longitudinal beam 8 and to each other. The two mounting plates 14 each have an approximately circular-arc-shaped base area, with two straight bounding lines forming between them an angle of 90° to 150°, particularly approximately 120°, and with a curved edge line 15, particularly one that approximately follows a circular line around the intersection point of the other two lines. This edge shape is not mandatory, however.

These mounting plates 14 are mounted such that they are shifted backward on the longitudinal beams 8 with respect to the center plane extending transversely to the direction of travel and between the front and rear wheels 3, 2. Since, owing to their deflection, the longitudinal beams 8 slope downward at this location toward the rear wheels 2 for example by 20° to 40°, the front (in the direction of travel) straight edge 16 of each mounting plate 14 is oriented approximately vertically. In the region of this approximately vertically extending front edge 16, each mounting plate 16 [numeral sic] is provided with two through-bores 17 disposed approximately vertically one above the other, for example at a mutual spacing of 5 to 15 cm, particularly about 10 cm, and offset slightly rearward from, for example 5 to 20 cm in back of, the transversely extending center plane of the frame 1. Passed through each of these bores 17 is a respective rivet pin, bolt or the like, which serves as a pivot axle for a respective one of the linkage rods 18, 19.

These rod-shaped links 18, 19 are elsewhere articulated to additional mountings 20 of the superstructure support frame 5.

The support frame 5 for the carriage superstructure 6 has an approximately rectangular shape, with two longitudinal struts 21 and two transverse struts 22. Attached thereto can be clasps or the like for attaching the superstructure 6. Secured to each of the two longitudinal struts 21 is a respective mounting 20. The two mountings 20 can be shaped similarly or identically to mounting plates 14; they are merely rotated approximately 180° relative to the lower mountings. They therefore point downward, and the curved edge 23 is in front and the straight edge in back. These mounting plates 20 are also each provided with two through-bores 24, whose mutual spacing is exactly the same as the spacing between the two through-bores 17 in a lower mounting plate 14. The connecting line between the center points of the bores 24 of a given mounting plate 20 is oriented approximately perpendicularly to the plane of the support frame 5. Extending through each bore is an axle, to which a respective one of the links 18, 19 is pivotably journaled. Hence, the two upper links 18, which are connected to each other by the respective upper bores 17, 24 and the axles received therein, and the two lower links 19, which are assigned to the respective lower bores 17, 24 and the axles disposed therein, form a parallel-link linkage, which has the consequence that when links 18, 19 are pivoted, the plane of the support frame 5 and therefore also any superstructure 6 mounted thereon always remain horizontally oriented.

Whereas mountings 14 are arranged at the inward sides of the chassis 4, mountings 20 are located on the outward sides of the support frame 5. The width of the support frame 5 is therefore narrower than the width of the chassis 4. Since the length of the support frame 5, measured in the direction of travel, is also shorter than the distance between the transverse struts 9, 10 of the chassis, when pivoted downward the support frame 5 is able to sink into in the chassis 4, so that the frame 1 can be collapsed to a particularly low height. Another major contributor to this effect is that mounting plates 14 are shifted to the rear on the chassis 4, whereas mounting plates 20 are fastened to the support frame 5 in such a way that the bores 24 associated with them are located approximately in the center of the support frame 5, viewed in the direction of travel, and the latter is therefore braced on both sides of its center of gravity in a way that virtually eliminates tilting moments. The support frame 5 is thereby able to move downward on its forwardly convex circular path during collapse.

Since links 18, 19 are disposed in a common plane on one side of the frame 1, they cannot be pivoted either completely vertically upward or completely downward. They must therefore be locked at least in the upwardly pivoted position in which the frame 1, with accompanying carriage, is used. This function is performed for example by a pin or hook, which is journaled to a mounting plate 14, 20 and electively extends into or can be moved out of the movement curve of the links 18, 19 and can be locked at least in the encroachment position.

Figure 3:
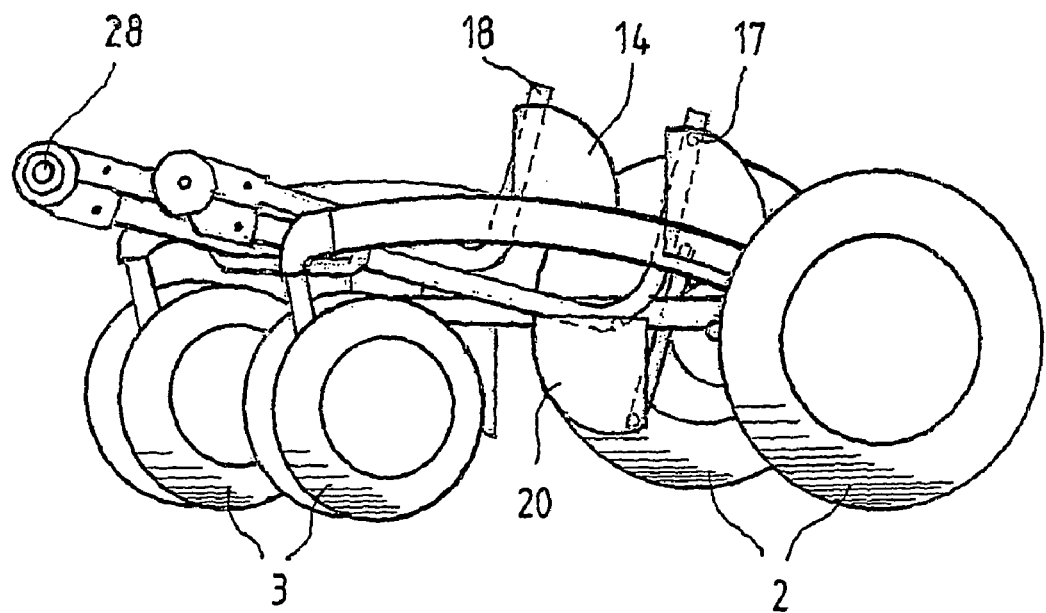
FIG. 3 shows the child carriage frame of FIG. 1 in the collapsed state, also in perspective representation.
Figure 4:
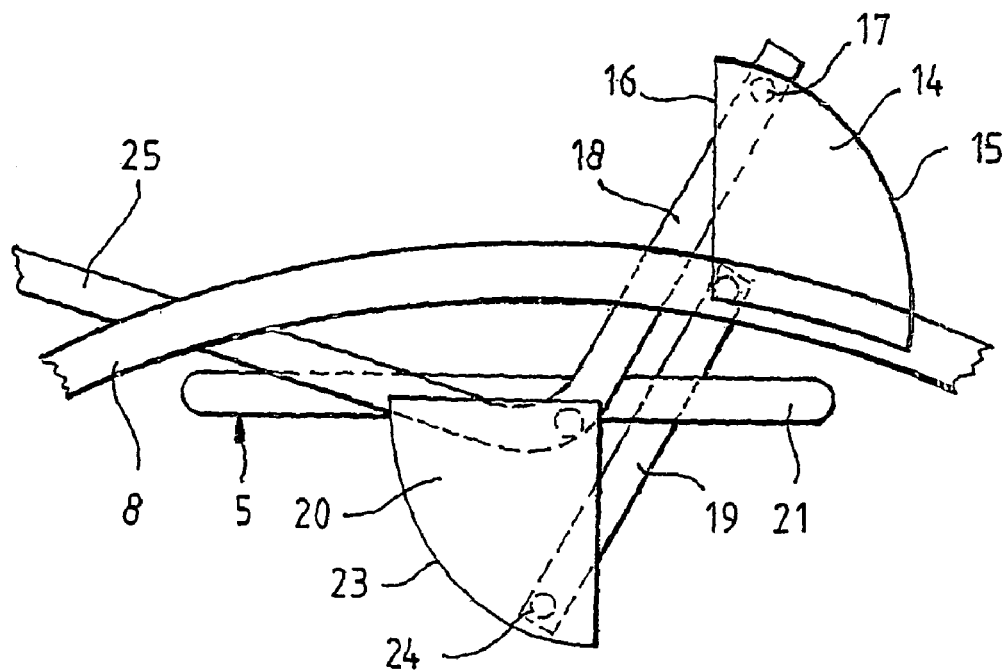
FIG. 4 is a side view of the folding mechanism of the collapsed child carriage frame from FIG. 3.

Whereas one link 19 on each side of the frame 1, preferably the respective lower one, terminates approximately in the region of its two articulation points 17, 24, the respective other link 18, preferably the upper one, is extended 25 outwardly beyond its upper articulation point 24. These extensions 25 are developed to form a push bar 26, and for this purpose are connected 27 to each other in the region of their free ends. A respective joint 28 located approximately in the center of each of the two extensions 25 enables the frame 1 to be collapsed into a very small, space-saving arrangement, as can be seen from FIG. 3. In the collapsed state, the overall length is barely longer than the chassis 4, and the maximum height is barely larger than the diameter of a rear wheel 2. Link 18 preferably forms an angle with its extension 26, preferably an oblique angle of between 120° and 170°.

Figure 5:
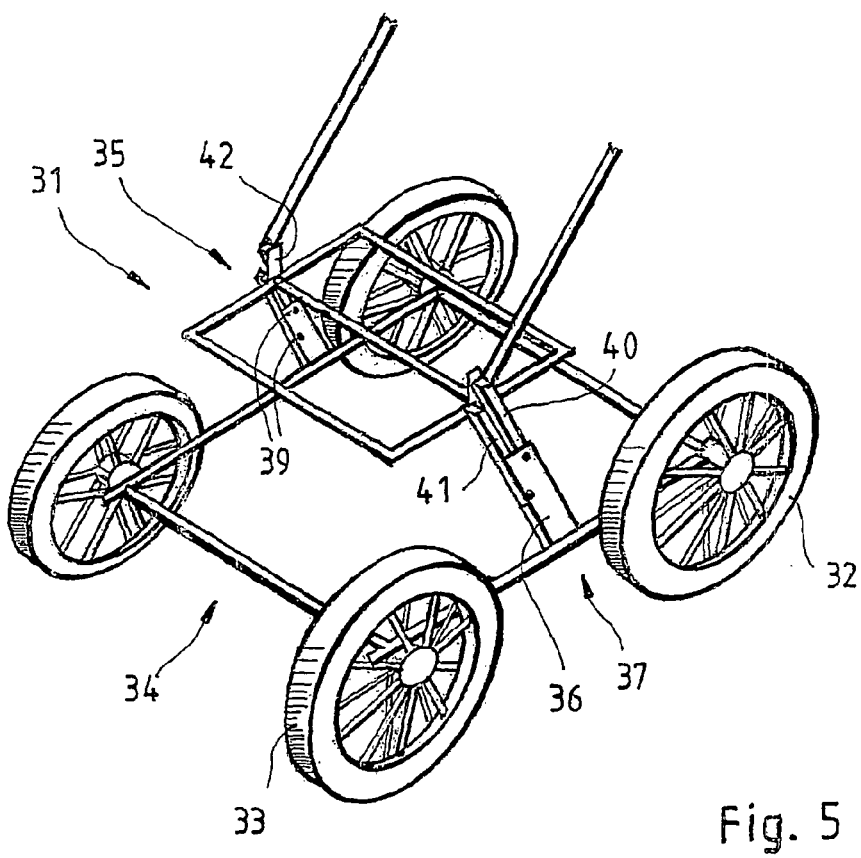
FIG. 5 is a perspective representation of a child carriage frame according to a further embodiment of the invention, in the erected state.
Figure 6:
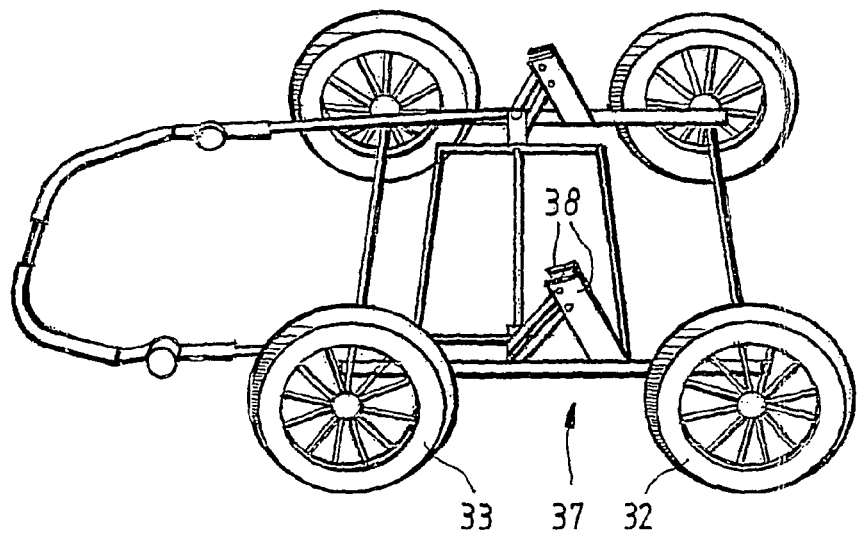
FIG. 6 shows the child carriage frame from FIG. 5 in the collapsed state.

The additional embodiments of a frame 31 illustrated in FIGS. 5 and 6 are basically the same as the first embodiment as regards the wheels, 32, 33, the chassis 34 and the support frame 35 for the superstructure 1. In contrast thereto, in this folding mechanism 37 the respective lower mountings 36 to the chassis 34 are configured not as plates, but as profile sections with an approximately U-shaped cross section. The longitudinal axes of these profile sections 36 are inclined slightly from the verticals, for example by 10° to 30°. The attachment of these profile sections 36 to the chassis 34 is also off-center, for example shifted to the rear. As a result of this, and due to their inclination converging toward the center of the frame, the upper ends of these profile sections 36 are located approximately on or near the center between a respective front and rear wheel 33, 32. There, i.e., in the region of their upper ends, the two mutually parallel legs 38 of the profile section 36 are each provided with two bores 39, which are aligned in pairs so a common axle can extend through them.

Journaled to each of these axles is a link 40, 41. The U-shaped profile sections 36, on the one hand, increase the lateral stability of the frame 1. On the other hand, they are inclined such that the links 40, 41 in their upwardly pivoted position are aligned with or extend parallel to the longitudinal axis of the U-shaped profile sections. It is therefore possible for a pin or the like to be arranged parallel to the axis of the profile section in the empty space between the two legs 38 and to be guided displaceably in the longitudinal direction of the U-shaped profile section 36.

If—as the invention further provides—the links 40, 41 are configured as hollow profile sections, for example as square profile sections or tubes, then such a pin can engage in such a hollow profile section or tube and thereby prevent it from pivoting further. It is naturally important in this regard for the respective link to be extended beyond its lower articulation point 39, to create a way for the locking pin or the like to engage at that location. Such a locking pin can for example be pushed into its raised, engaged position by a compression spring and must be actuated manually, i.e. depressed, in order to collapse the frame 31. A further advantage of such a locking technique is that the lateral stability of the frame 31 is also increased.

As a further particularity, in this embodiment 31 the upper mounting plates 42 extend upward from the support frame 35.

Embodiment 51 of FIGS. 5 to 9 was created by developing embodiment 31. The most material differences appear in the chassis 54 carrying the wheels 52, 53, whereas the support frame 55 for the superstructure, the push bar 56 and the folding mechanism 57 are largely the same as the corresponding elements of embodiment 31.

The longitudinal beams 58 of the chassis 54 are each divided into a front segment 59 and a rear segment 60. These two segments 59, 60 are not connected directly to each other, but rather each is connected to a mounting part 61 similar in structure and function to the corresponding mounting part 36 of embodiment 31. This part can also, however, be implemented in this embodiment as an injection-molded part, made for example of plastic or metal, particularly of aluminum. It is therefore possible to choose a relatively complex geometry, for example comprising a lower, approximately square-shaped cross section 62, an adjacent region having a U-shaped cross section 63, and an upper, approximately fork-shaped region 64, where for example the articulation points 65 for the links 66, 67 are also disposed. Inserted in a forwardly open clearance of an attachment 74 to mounting 61 is a respective forwardly projecting member segment 59.

Figure 7:
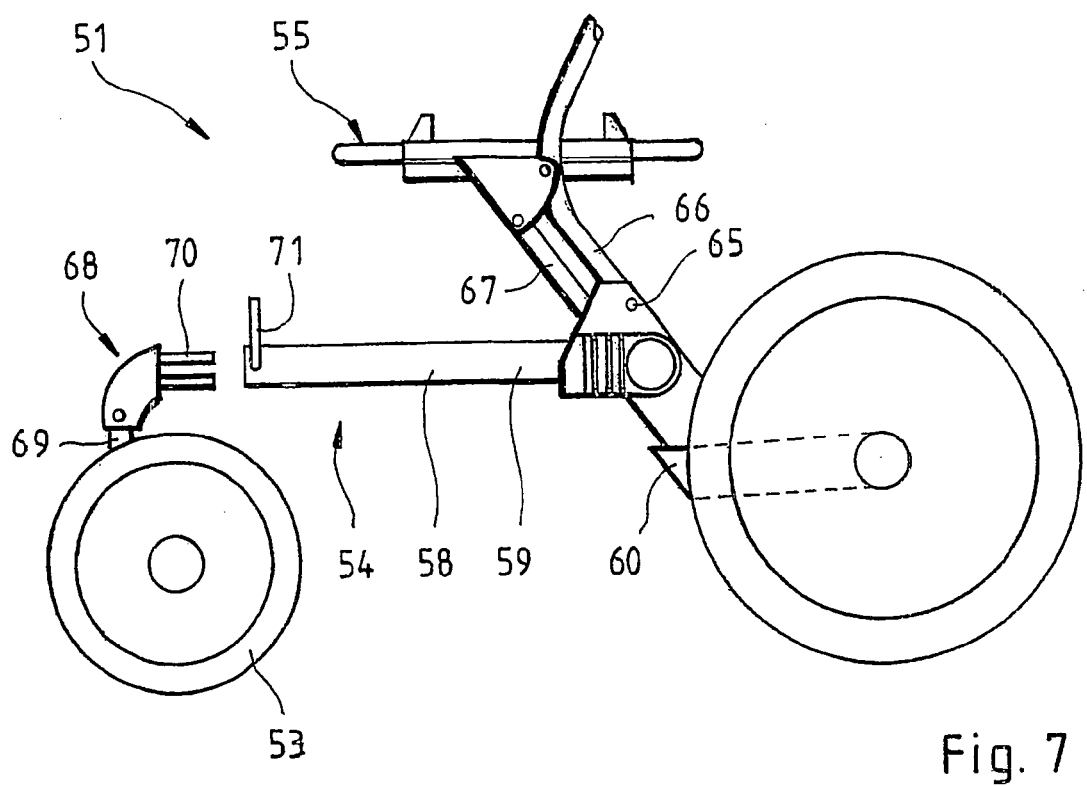
FIG. 7 is a side view of the child carriage frame of an additionally modified embodiment of the invention.
Figure 8:
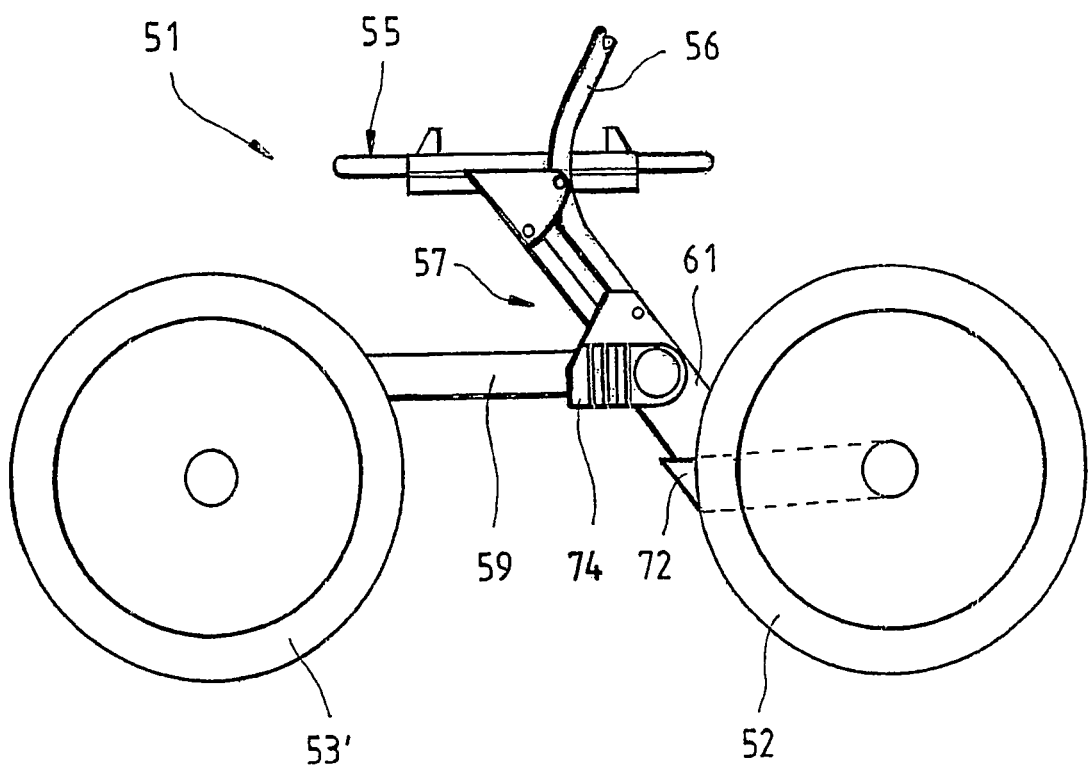
FIG. 8 shows a modification of the child carriage frame from FIG. 7.

This member segment 59 can be configured as hollow and/or can be provided at its front end with a means for adding on, particularly inserting, the journal part 68 proper, each of which carries one or two front wheels 53. As FIG. 7 shows, in the case of steerable front wheels 53 this journal part 68 can be configured as a knee piece with a downwardly projecting pivot axle 69 about which the actual axle bearing of the front wheels 53 is able to pivot. For insertion in member segment 59, provided on bearing part 68 are rearwardly oriented insertable extensions 70, the locking whereof can take place inside member segment 59, for example using a clamping element 71. Member segments 59 are preferably connected to each other by cross-struts in the region of their respective front ends and in the region of mounting parts 61. This scheme makes it possible to remove the front wheels 53 and replace them with other, for example non-steerable, front wheels 53', or vice versa.

Attached to the bottom end of each mounting part 61 is a respective rocker arm 72, which points approximately horizontally backward and whose length is slightly greater than the radius of a rear wheel 52. Disposed at the free end of each rocker arm 72 is the journal bearing for the respective rear wheel 52. These rocker arms 72 are resiliently mounted, i.e. they can to a limited extent execute a pivoting movement upwardly about an axis extending transversely to the direction of travel, but are pushed back into a lower position by the force of a spring preferably disposed in the mounting part 61 and/or in the rocker arm 72. This makes it possible to compensate for uneven ground.

Figure 9:
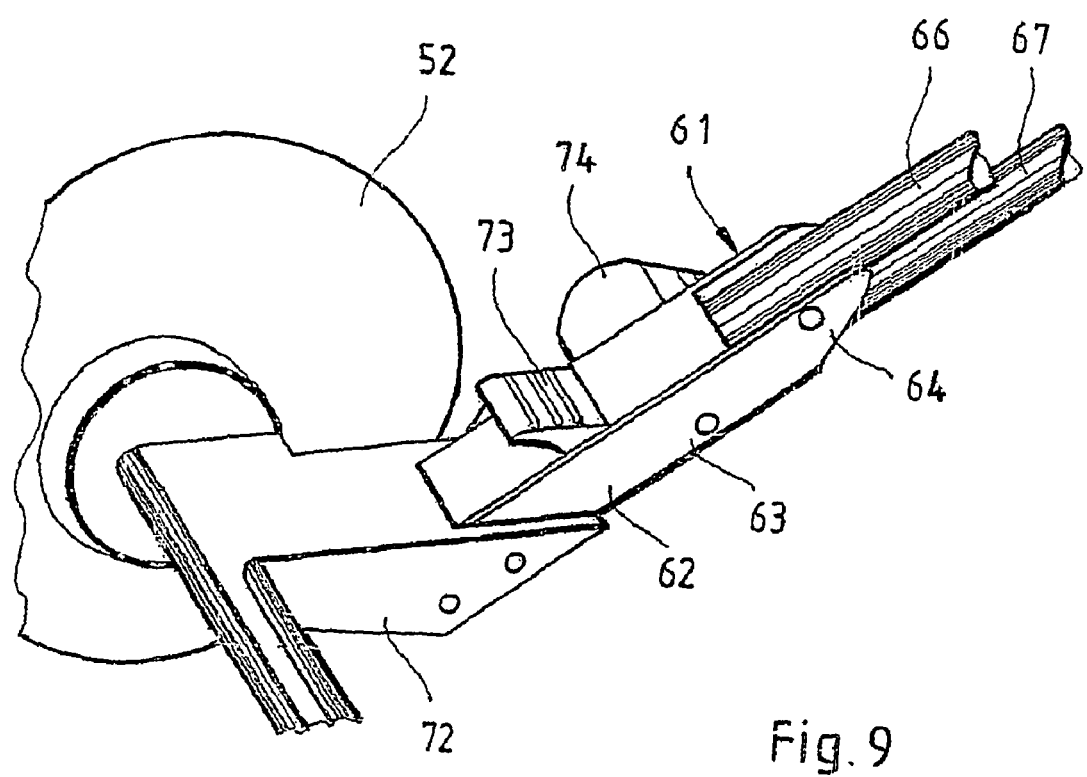
FIG. 9 shows a detail of the child carriage frame from FIG. 7 in perspective representation.

FIG. 9, it will be noted, also illustrates an element 73 shaped in the manner of a (small) foot pedal for the releasing actuation of a locking pin, which is integrated into mounting part 61 and is pushed upward by a spring into the end clearance of a tubular link 66. By means of the foot pedal 73, this pin is made to travel along a guide and temporarily downward against the action of the spring, and thus out of the end of link 66.

The invention claimed is:

1. A child carriage with a superstructure (6), particularly a seat, shell, or pouch, for a child, and with a collapsible frame (1; 31; 51), the carriage comprising a chassis (4; 34; 54) with a plurality of wheels (2, 3; 32; 33; 52; 53; 53'), a frame (5; 35; 55) supporting the superstructure (6), and, disposed between said chassis and said frame, a folding mechanism (7; 37; 57) operative to vary the distance of said frame (5; 35; 55) for the superstructure (6) from said chassis (4; 34; 54), whereby said chassis (4; 34; 54) includes two longitudinal beams (8) which are rigidly interconnected in their front and back regions by in each case one transverse strut (9), whereby disposed at a back end of each longitudinal beam (8) is a journal bearing for the respective wheel (2), and wherein said folding mechanism (7; 37; 57) comprises at least two mutually parallel links (18, 19; 40, 41; 66; 67), characterized in that a) said links (18, 19; 40, 41; 66; 67) are articulated in the manner of a flat parallelogram linkage to said chassis (4; 34; 54), on the one hand, and to said support frame (5; 35; 55), on the other, such as to be pivotable about respective axes that pass generally perpendicularly through a plane of the parallelogram linkage, wherein b) said folding mechanism (7) is connected to both longitudinal beams (8) of the chassis (4), wherein the two links (18, 19; 40, 41; 66, 67) on the same respective side of said child carriage frame (1; 31; 51) are articulated to a common mounting element (14; 36; 61) of said chassis (4; 34; 54), and further wherein c) the longitudinal beams (8; 58) are each divided into a front (59) and a back region (60) by the respective two lateral mounting elements (14; 36; 61) for each pair of said links (18, 19; 40, 41; 66, 67), and wherein d) the connecting line between points of articulation (39; 65) of said links (18, 19; 40, 41; 66; 67), which lie approximately in a common plane to said chassis (4; 34; 54) forms a greater angle with the horizontal contact plane of the wheels (2, 3; 32; 33; 52; 53; 53') than with the verticals extending perpendicular to the plane, and wherein e) one of said two links (18, 19; 40, 41; 66; 67) of a pair is extended (25) beyond its point of articulation (24) to said superstructure frame (5; 35; 55), whereby the extensions (25) of said two links are configured as a push bar (26).

2. The child carriage according to claim 1, characterized in that the horizontal outer dimensions (length, width) of said support frame (5; 35; 55) are smaller than the corresponding inner dimensions of a clearance in the upper side of said chassis (4; 34; 54), such that said support frame (5; 35; 55) can sink into said chassis (4; 34; 54) when said child carriage frame (1; 31; 51) is collapsed.

3. The child carriage according to claim 1, characterized in that said support frame (5; 35; 55) is disposed between said links (18, 19; 40, 41; 66, 67).

4. The child carriage according to claim 1, characterized in that a distance, measured parallel to a wheel axle, between two of said links (18, 19; 40, 41; 66, 67) on opposite sides of said child carriage frame (1; 31; 51) is smaller than the correspondingly measured distance between two lateral struts of said chassis (4; 34; 54) that extend generally in the direction of travel.

5. The child carriage according to claim 1, characterized in that one of said links (18, 19; 40, 41; 66, 67) is articulated such that it traverses a pivot angle of more than of 150°, between a collapsed and an erected state of said child carriage frame (1; 31; 51).

6. The child carriage according to claim 5, characterized in that said folding mechanism (7; 37; 57) is configured such that in the erected state of said child carriage frame (1; 31; 51), the ends of said links (18, 19; 40, 41; 66, 67) which are not articulated to said chassis (4; 34; 54) are disposed above their points of articulation (39; 65) to said chassis (4; 34; 54), whereas in the collapsed state they are below said articulation points (39; 65).

7. The child carriage according to claim 1, characterized in that a mounting element (14; 36; 61) of said chassis (4; 34; 54) is formed by a bracket (14), or by two mutually parallel brackets (36), to which, or between which, said respective links (18, 19; 40, 41; 66, 67) are pivotably articulated.

8. The child carriage according to claim 7, characterized in that two mounting brackets (14; 36; 61) of said chassis (4; 34; 54) that are assigned to the same links (18, 19; 40, 41; 66, 67) form one of side legs of a fork and a profile section of U-shaped cross section.

9. The child carriage according to claim 1, characterized in that points of articulation (17, 24; 39; 65) of said two links (18, 19; 40, 41; 66, 67) of a pair to the respective mounting element (14; 36; 61), are disposed generally vertically one above the other.

10. The child carriage according to claim 9, characterized in that the mounting elements (14; 36; 61) and/or the lower articulation points (17; 39; 65) of said parallel links (18, 19; 40, 41; 66, 67) are disposed between the front and rear wheels (3, 2; 33, 32; 53, 53', 52) and thus between front and rear axles, so that a pivoting movement is not obstructed by either a front or a rear axle of said chassis (4; 34; 54).

11. The child carriage according to claim 1, characterized in that provided behind the respective two lateral mounting elements (14; 36; 61) for each pair of links (18, 19; 40, 41; 66, 67) and/or behind the lower articulation points (17; 39; 65) of said parallel links (18, 19; 40, 41; 66, 67) is a respective rearwardly projecting rocker arm (72), to the free end of which a respective rear wheel (2; 32; 52) is journaled.

12. The child carriage according to claim 1, characterized in that the two rocker arms (72) are resiliently mounted relative to the respective mounting element (14; 36; 61).

13. The child carriage according to claim 1, characterized in that provided in front of each of the two lateral mounting elements (14; 36; 61) for each pair of links (18, 19; 40, 41; 66, 67) and/or in front of each of the lower articulation points (17; 39; 65) of said parallel links (18, 19; 40, 41; 66, 67), is a forwardly projecting strut, in the region of the free end of which at least one front wheel (3, 33; 53, 53') is journaled.

14. The child carriage according to claim 1, characterized in that the push bar (26) is adjustable in length by means of articulated and/or telescoping joints.

15. The child carriage according to claim 1, characterized in that a region of an extended link (18, 19; 40, 41, 66, 67) located beyond said support frame (5; 35; 55) and developed into the push bar (26) forms an angle with its region between said support frame (5; 35; 55) and said chassis (4; 34; 54) that is equal to more than 90°.

16. The child carriage according to claim 1, characterized in that said folding mechanism (7; 37; 57) is configured such that the push bar (26) pivots over and past said support frame (5; 35, 55) during erecting and/or collapsing of the carriage.

* * * * *